Dec. 23, 1969   J. W. BAKER   3,485,002
IMITATION SPANISH TILE
Filed July 11, 1967   2 Sheets-Sheet 1
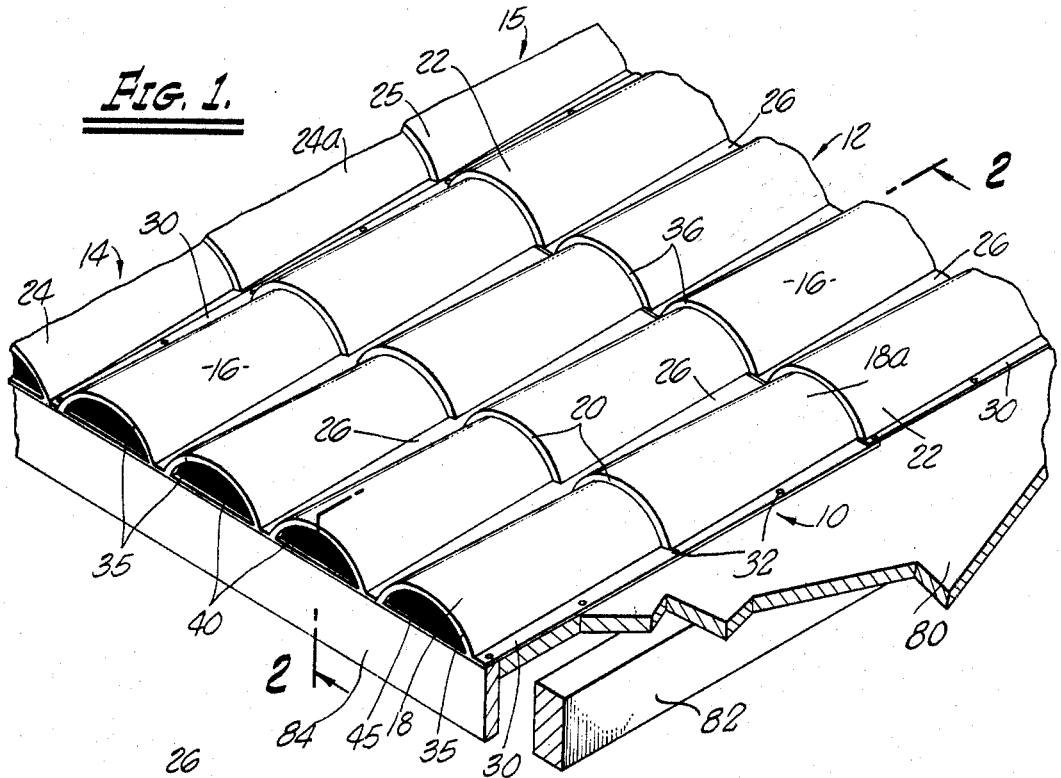
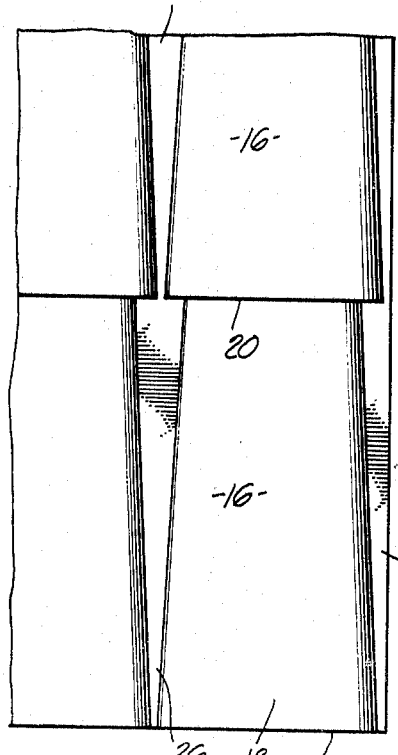
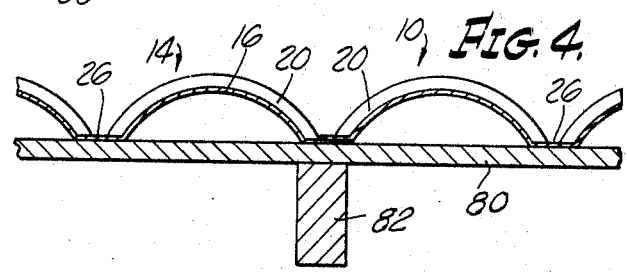
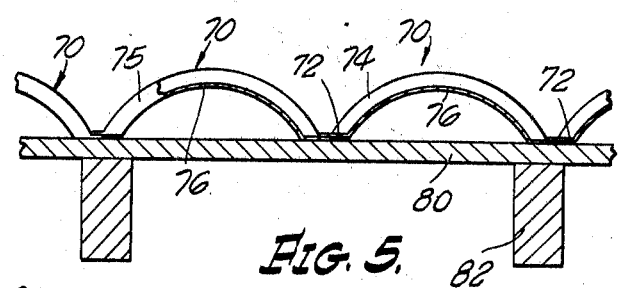
JAMES W. BAKER
INVENTOR
BY
ATTORNEY

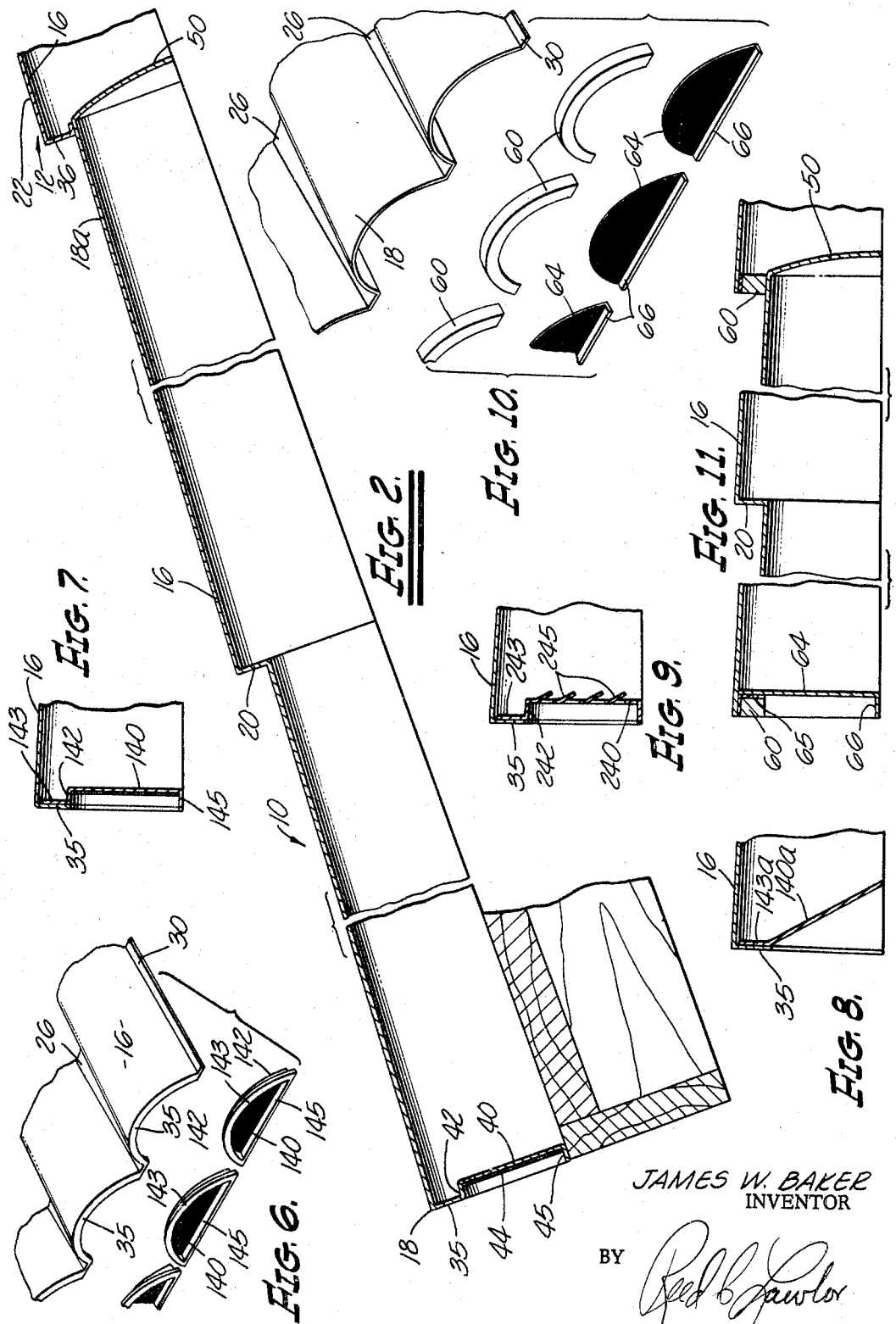

United States Patent Office 3,485,002
Patented Dec. 23, 1969

3,485,002
IMITATION SPANISH TILE
James W. Baker, Santa Monica, Calif., assignor to Hunter Structures, Inc., Los Angeles, Calif., a corporation of Delaware
Filed July 11, 1967, Ser. No. 652,544
Int. Cl. E04d 1/08; B44f 9/00
U.S. Cl. 52—314          2 Claims

ABSTRACT OF THE DISCLOSURE

The invention resides in imitation Spanish or mission tile produced from thin sheets, such as thin metal sheets or thin hard or solid plastic sheets of common plastic materials, which include thermo-setting and thermo-plastic materials, that may represent laid-up courses of ceramic tile, and may in themselves be laid up to represent courses of ceramic tile. These tile imitations preferably bear the reddish color of conventional Spanish ceramic tile, particularly where the outer lower ends of such simulated tiles are closed, preferably with dark colored end panels or light barriers or closures to simulate spaces darkened by shadows cast by conventional ceramic tiles at their open lower ends.

---

This invention involves production of imitation Spanish roofing tile, which is also sometimes known as mission roofing tile. The product simulates very closely in appearance actual Spanish or mission roofing tiles which are arcuate in shape and formed of ceramic material. The product may be formed from shaped aluminum sheets, but, preferably and more practically, from any appropriate, normally hard or stiff or rigid, thermo-plastic material or thermo-setting plastic material. Such a plastic product may be obtained by molding a fluid material passed into a mold, but it is preferred to produce it from normally hard or solid sheets of plastic material which is then shaped by heating in a mold to the desired shape.

Preferably, the plastic material is colored to match the reddish color of typical Spanish ceramic tile. The simulating structure is commonly shaped in proportions to simulate in elevation and in plan view the usual curves and thickness of Spanish ceramic roofing tile, for example, approximately three-quarters of an inch thickness. The cross-sectional thickness of the overall sheet itself from which the imitation tile is produced, usually will be less than one-tenth of an inch, for example, about 0.062″. If aluminum or other sheet metal is used, it will be similarly colored in any desired manner, and a similar thickness of sheet employed. Other thin sheet materials, such as steel sheet or galvanized iron sheet may be used. This imitation tile product is useful for decorative purposes in building and other structures and is also usable as an imitation roofing material, being for this purpose substantially waterproof and resistant to weather conditions. The product is not intended for ordinary roofing, partly because it has neither the thickness nor the strength for such purposes, being produced for inexpensive constructions and for decorative aspects predominantly. The tile is shaped usually as a plurality of integrally connected arcuate units flanged at their end edges to simulate ceramic mission tile or Spanish tile thicknesses. It also is closed at least at its lower outer end when in position, such end or ends being closed by light barriers in the form of panels which are colored black or other dark color to simulate an interior space or cavity that appears dark or black because of shadows cast at the lower outer ends of conventional ceramic tile. Such end closing panels are desirably offset or inset inwardly to aid in producing the illusion of a dark hollow cavity on the lower inner side of conventional Spanish tile.

BACKGROUND OF THE INVENTION

In many geographical areas it is common, and often customary, to employ roofing material for various buildings, which is known as Spanish tile or mission tile, each tile being arcuate in cross-section, a series of such tiles being laid side by side or transversely along the outer roof edge in the form of a course of tiles. Adjacent the upper edges or ends of such a course of tiles, a second course is laid with the lower end of such second course overlapping somewhat the upper ends of the first course for the purpose of shedding rain water from the upper course onto the lower course which then diverts the water over the edge of the roof thus formed. The courses of tiles so laid are carried upon any appropriate sub-roofing. As a consequence, the lower outer edges or ends of the various tiles of these courses, which may be around one-half inch to three-quarters inch in thickness, are exposed to view. In addition, the outer ends of the lowermost course of tiles cast shadows under their lower outer ends. These tiles, being of ceramic material, are consequently quite heavy.

It is desired, according to this invention, to produce structures which simulate such ceramic Spanish tile roofs in many installations for both indoor and outdoor use, which are decorative from the standpoint of appearance, and are relatively light in weight, and which are capable of use for outdoor functions to shed rain.

SUMMARY OF THE INVENTION

The invention resides in imitation Spanish or mission tile produced from thin sheets, such as thin metal sheets or thin hard or solid plastic sheets of common plastic materials, which include thermo-setting and thermo-plastic materials, that may represent laid-up courses of ceramic tile, and may in themselves be laid up to represent courses of ceramic tile. These tile imitations preferably bear the reddish color of conventional Spanish ceramic tile, particularly where the outer lower ends of such simulated tiles are closed, preferably with dark colored end panels or light barriers or closures to simulate spaces darkened by shadows cast by conventional ceramic tiles at their open lower ends.

In the accompanying drawings, wherein various forms of the invention are illustrated:

FIGURE 1 is a perspective view disclosing a portion of a roof structure upon which imitation Spanish tile roofing of this invention has been employed, the lower tile course constituting two integral transverse sections, the upper tile course being a transverse fragment of one row of imitation tile, these courses being mounted upon a sub-roof;

FIG. 2 (sheet 2 of the drawings) is a longitudinal section taken on an enlarged scale along the line 2—2 of FIG. 1, portions being broken away and most of the underlying support structure being omitted;

FIG. 3 is a fragmentary plan view such as taken from the lowermost corner of FIG. 1;

FIG. 4 is a fragmentary cross-section illustrating how ends of two adjacent tile courses may be overlapped in installation;

FIG. 5 is a cross-sectional view indicating how all tile sections may be formed from single tile units which are overlapped at their junctures in a manner similar to that of FIG. 4;

FIG. 6 is an exploded perspective view indicating another arrangement of end panels for simulating shadows;

FIG. 7 is a longitudinal sectional fragment showing how the parts of FIG. 6 are assembled in operative relation;

FIG. 8 is a fragmentary section showing a modification of the structure of FIG. 7;

FIG. 9 is another fragmentary section showing a further modification of FIG. 7;

FIG. 10 is an exploded view illustrating a modification wherein the lower end panel structure for producing simulated shadow effects is composed of separate pieces to be secured together in cemented relationship; and FIG. 11 is a longitudinal section showing all the parts of FIG. 10 cemented together as installed.

Other forms which the invention may take will become apparent to those skilled in the art upon reference to the following specification.

In the drawings, FIG. 1 discloses in perspective the presently preferred embodiment of this invention, FIGS. 2 and 3 disclosing respectively in longitudinal section and plan view the same form of the invention. Here, there is represented a full lower course 10 of four simulated tile units formed from a single plastic sheet, a fragment of a course 12 similarly formed from a single plastic sheet and represented by fragments of four simulating units, a fragment of a second lower course 14 lying alongside course 10 and showing only two unit fragments, and a small fragment of a course 15 lying alongside course 12.

Each of these courses 10, 12, 14, and 15 is produced from a single relatively thin plastic sheet 16 formed into the arcuate shapes illustrated, which are designated 18 where they form the lower sections of course 10 and are designated 18a where they form upper integral sections of course 10. Thus, as will be seen from the drawings, the lower sections 18 are integrally connected with the upper sections 18a by arcuate offsets 20 directed radially toward the axes of the sections. The courses 12, 14, and 15 have the same structural arrangement as that of course 10, and, for the purpose of the illustration, each would consist of four lower unit sections integrally joined with four upper unit sections. The lower unit sections of course 12, which overlie the upper unit sections 18a of course 10, are indicated at 22; the illustrated lower unit section of the course 14 is designated 24, the corresponding upper unit section of course 14 being indicated at 24a; similarly the lower unit section shown for the course 15 is designated 25.

All adjacent unit sections of a given course are integrally connected by portions 26 of the corresponding course, such sections 26 lying substantially in the same horizontal plane. However, later edges of each course are formed as longitudinally extending lateral flanges 30 which lie in substantially the same plane as the corresponding integral connecting portions 26. These lateral flanges 30 enable the various courses to be nailed down readily, as indicated at 32 at the right of FIG. 1, and to be overlapped for nailing down of adjoining courses as indicated in FIG. 4.

In the best form of this improvement now known, the simulating tile portions are tapered, particularly as indicated in FIGS. 1 and 3. In this manner, lower and outer ends of an upper tile section is, as illustrated, neatly fitted over the upper and inner end of a lower tapered section. Where an upper course, such as the course 12, is being installed over a lower course, such as course 10, such upper course 12 has its lower end fitting neatly over the upper end of tthe lower course 10, in true simulation of a typical ceramic tile installation which is tapered. This is best indicated at the right end of FIG. 2, as presently will be more fully explained.

In order to simulate normal thickness of a conventional ceramic tile, the forward ends of all the imitation tile sections of all the courses are flanged radially inward. This is especially indicated at 35 at the lower forward ends of the tile units of FIGS. 1, 2, 8, and 9. These radial flanges 35 are proportioned to conform with the dimensions of the offsets 20 between longitudinally aligned tiles as previously described. Also, the forward outer ends of the lower tile units of upper courses are similarly radially and annularly flanged as indicated at 36 in FIGS. 1 and 2. These radial flanges 35 provide a product which simulates the thickness of Spanish tile even though it is made of thin sheet material. In this manner, when the lower tile section of an upper course is lapped over the upper end of an upper tile section of a lower course, the simulation of overlapping conventional ceramic Spanish tiles is complete, this being effected by reason of the mentioned radial flanges 35 and 36 and the intervening offsets 20 within the respective courses.

From the foregoing, it will be seen that, as well illustrated in FIG. 1, when a plurality of imitation plastic tile courses is set up as described, simulation of natural ceramic Spanish tile is accomplished.

The desired simulation is further effected through the medium of light barriers in the form of integral darkened enclosing panels 40 at the lower outer ends of the lower outermost portions of the lowermost courses, this being probably indicated best in FIGS. 1 and 2. In this construction, the arcuate portions 40 are integrally connected with the radially flanged portions 35 through the medium of offsetting axially directed arcuate flanges 42. The outwardly facing sides of the arcuate panels 40 are preferably painted in any appropriate manner, such as by dark colorings like black, or very dark brown, or very dark red, as appropriate. Thus, when an observer views the outer faces of these panels 40 the illusion of shadows under the tile sections is effectual. This condition is best seen in FIG. 1 and may be in the form of a coating 44, such as a layer of black paint indicated in FIG. 2. Also, for the purpose of rigidity and the purpose of attachment if required, the lower edge of each panel 40 is provided with an outwardly directed integral flange 45. The upper surface of this flange is also painted with such coloring. With this arrangement, the illusion is complete.

While the imitation Spanish tiles here imitated are somewhat tapered as hereinbefore indicated for the purpose of providing the neat fit illustrated, the axes of these units are nevertheless substantially parallel and would be laid up into an operative structure so as to be substantially parallel. While most of the tiles illustrated are tapered, nevertheless, some Spanish tiles are formed without a taper and each unit is therefore partially cylindrical, although normally less than semicircular in cross section, that is, partially circular. It is therefore within the scope of this invention to produce simulated tile wherein the various tile sections are partially cylindrical, although, in order to give the neat fit illustrated, the tapered tile simulation is preferred.

In connection with the use of plastic sheets which yield a substantially hard or stiff product, a desirable further simulation of Spanish tile involves forming a mold directly from a piece of conventional ceramic tile, so that when the plastic sheet is molded, all the natural lines, striations, dents, and other imperfections of a commercial Spanish tile will appear, in order to make simulation more complete, when such imitation tile is made up into a decorative or other building structure for view at close range.

In order that narrow roof-line structures may be constructed from the simulated Spanish tile of this invention, the upper end of each tile course, as illustrated in FIG. 2, also may be enclosed as indicated at 50 in FIG. 2. This end 50, as formed in the mold being employed, may be somewhat curved as represented, this curvature being employed either from the standpoint of improving the appearance when such end is in view, or from the standpoint of facilitating molding. Additionally, such closed upper end, whether curved or substantially flat, serves to exclude rain and the like, where the structure is employed outdoors and the exposed end 50 is subject to weather conditions. In connection with these constructions, where the term approximately semicylindrical is used, it will be understood that it is intended to describe an imitation structure which is either tapered, thus being partially conical or frusto-conical, as hereintofore described, or concave or substantially semicylindrical as above indicated, especially since Spanish ceramic tiles of both outlines have been employed. In either event, the cross-sections are concave and somewhat less than semicircular, for example, forming arcs between about 90° and about 180°. A usual tile section will have an arc of about 120°, that is, between 110° and 130°. A usual tile section of such curvatures may have a length of about 16 inches and an average width between about seven inches and eight inches, with a depth around two to two and one-half inches. Imitation Spanish tiles of both outlines are here intended to be included.

A further modification of this improvement which is within the scope of the invention is illustrated in FIGS. 6 and 7. Here, instead of making the closing end panel 40 integral with the edge of its flange 35, such end panel may be separately molded or otherwise shaped as a separate unit 140 which is provided with an offspring ring 142 and is provided with an attaching flange 143 that is cemented in place behind the radially positioned integral flange 35. Here, a stablizing flange 145 integral with the panel 140 at its bottom also may be used for attaching the unit to the sub-roof structure or other supporting structure.

The effect of shadow may be accomplished by other means than the use of a dark color on the forward end panels or light barriers 40 and 140. For example, in FIG. 8 a modification of the form of FIG. 7 is shown where an end closing panel 140a is used that is positioned at an angle to the tile body in re-entrant location so that it projects back into the interior of the tile unit, and at least to some extent, actually yields some shadow. The upper edge of the panel 140a, is secured through a mounting flange 143a, to the inner wall of the upper portion of the radial flange 35. Especially where the parts are made of plastic, securing may be effected by cementing. Another means for producing shadow effects is indicated in FIG. 9. Here, the end closing panel 240, which is attached to the rear of the radial flange 35 through the medium of flange parts 242 and 243, has been slitted to produce instruck louvre members 245 that provide corresponding openings as shown which will serve the two-fold purpose of yielding shadow effects interiorly and providing for ventilation in locations where ventilation is desirable.

Another modification which is within the scope of this disclosure is that illustrated in FIGS. 10 and 11 for closing the outer ends of the respective imitation tile units. Here, instead of using the integral radially directed flange 35 at the end of the tile unit, molded plastic end pieces or strips 60 of arcuate shape may be employed and secured, as by cementing, to the inner walls of the arcuate tile section 18 or other similar section and ended panels 64 of appropriate material then cemented, as at 65, to the inner wall of the respective arcuate molded piece or strip. Here again these end panels may have a flange portion 66 to stabilize the panel structure 64 and provide for attachment to a supporting roof structure. This type of end panel mounting is useful also where the lower end of an upper course is to be mounted over the upper end of a lower course, because the panel section 64 may be omitted and the molded strip 60 only used to rest upon the upper end of the lower underlying tile section. With this arrangement, the rearward or upper end closure 50 (FIG. 2) may or may not be used, as seems necessary or desirable.

While the simulated Spanish tile sections above described have been disclosed as appearing in assembled integral units comprising four sections laterally from side to side and two sections longitudinally from top to bottom, it will nevertheless be appreciated that these sections may be produced to simulate more integral units or to simulate only individual tile units. An arrangement of the latter type is illustrated in FIG. 5. Here, units arranged side by side in parallel relationship may all be cast or molded as separate units 70, each of which is flanged at each side at 72 to correspond with the flanges 30 illustrated in FIGS. 1, 3, and 4. Such flanges 72 of adjacent units are overlapped when installed, as illustrated. Offsetting portions 74, corresponding with the offsetting portions 20 may be employed, as before, to give the illusion of thickness. End flange portions 75 corresponding with the flanges 35 also will be used as required.

As illustrated in FIGS. 1, 2, 3, and 4, the shaped plastic structures described are adapted to be mounted upon appropriate supporting sub-roof devices. These may include sloping roof boards 80 ranged side by side as illustrated, if desired, these boards in turn being supported as by beams 82 positioned at their outer ends as by facia boards 84. Thus, roof portions, or simulated roof portions, may be constructed at any angle, preferably at a sloping angle, to present a simulated plastic Spanish tile structure in whatever position desired to produce a given effect, whether from a purely decorative aspect or for a combined decorative and structural purpose, or from an inexpensive purely structural aspect.

As has been previously stated, simulated tile hereof may be thermo-plastic materials or thermo-setting mateminum or galvanized iron sheets, and also preferably from plastic sheets. These plastic sheets may, for example, be pre-formed sheets obtained from injection molding or compression moldings, or otherwise. The plastics used may be thermo-plastic materials o r thermo-setting materials as required for the particular process, and may include such operable materials as cellulose acetate, methacrylate, ethylcellulose, polystyrene, some of the vinyls, and the like, which are listed in the handbooks as having good mold properties. A desirable material which has been specifically employed is a cellulose nitrate presently marketed by Monsanto Chemical Company of Springfield, Mass., as Nitron 376 listed as flame resistant. Such hard plastic sheets are not necessarily rigid but may be yielding or flexible in the form of sheets two or three feet square, for example, and having such thicknesses as previously indicated.

The invention claimed is:
1. An imitation Spanish tile structure comprising:
a first simulated Spanish roofing tile structure of relatively thin sheet material shaped to define a course of a plurality of connected elongated arcuate tile sections curved about individual substantially parallel axes and having cross-sections approximating semicircular configurations, each of said tile sections having a forward lower end and enclosing, within its elongated arcuate configuration, an elongated downwardly facing enclosed space;
a narrow radial flange at the forward lower end of each arcuate section formed in representation of ceramic roofing tile thickness; each said radial flange being located in a plane extending transverse to the axis of its corresponding arcuate tile section and having an outer edge curved in conformity with and integral with the forward lower end of its corresponding arcuate tile section, each said radial flange also having a curved inner edge spaced from the curved outer edge thereof;
a narrow axially directed arcuate flange underlying each of said arcuate tile sections, each of said axially directed flanges having a forward edge integral with the curved inner edge of the radial flange of the corresponding arcuate tile section and having a rearward edge spaced from said forward edge in an axial direction, light barrier panels disposed adjacent the forward lower end of each arcuate tile section, each of said panels extending in a plane substantially parallel to that of said radial flange and having a curved outer edge integral with the rearward edge of said axially directed arcuate flange whereby each of said panels is substantially parallel to and offset inwardly from said radial flange, said panels being substantially co-extensive with the depth of said forward lower ends and presenting the illusion of shadow under the forward end of the respective tile setcion while closing the forward end of the respective tile section; and a narrow substantially flat, axially directed flange integral with the lowermost edge of each of said panels and extending outwardly relative to said panel in contiguity with said axially directed arcuate flange to rigidify the forward lower end of each of said tile sections;

a second simulated Spanish roofing tile structure disposed rearwardly of said first simulated roofing tile structure, said second roofing tile structure also being formed of sheet material in simulation of Spanish roofing tile and including a course of a plurality of connected elongated arcuate tile sections curved about individual substantially parallel axes and having cross-sections approximating semicylindrical configurations, each elongated arcuate section of said second roofing tile structure having a forward lower end provided with a relatively narrow radially inwardly directed flange simulating the thickness of a ceramic roofing tile, the inner edge of each such radial flange of said second roofing tile structure being in contiguity with and conforming in shape to an upper rearward portion of an elongated arcuate tile section of the first-mentioned simulated Spanish roofing tile structure and bearing thereon;

and moisture barrier closure panels integral with and disposed at the rearward upper end of the elongated arcuate tile sections of said second roofing tile structure, said closure panels extending across and substantially closing the upper ends of said arcuate section.

2. An imitation Spanish tile structure as in claim 1, wherein each elongated arcuate tile section is tapered from its forward lower end to its rearward upper end.

References Cited

UNITED STATES PATENTS

| | | | |
|---|---|---|---|
| 600,606 | 3/1898 | Bayer | 52—536 |
| 626,006 | 5/1899 | Heidt | 52—537 |
| 2,004,198 | 6/1935 | Fall | 52—536 |
| 2,160,642 | 5/1939 | Bumpas et al. | 52—537 |
| 2,029,869 | 2/1936 | Hering | 52—556 |

HENRY C. SUTHERLAND, Primary Examiner

U.S. Cl. X.R.

52—536, 542, 555